United States Patent

Alcocer

[11] Patent Number: 5,184,659
[45] Date of Patent: Feb. 9, 1993

[54] SUN RESISTANT, FOLDABLE WINDOW SHADE

[76] Inventor: Hector Alcocer, 207 Greenwich, San Antonio, Tex. 78209

[21] Appl. No.: 795,464

[22] Filed: Nov. 21, 1991

[51] Int. Cl.⁵ ............................................... A47H 5/00
[52] U.S. Cl. ............................ 160/84.1; 160/DIG. 7
[58] Field of Search .................... 160/84.1, 84.2, 84.3, 160/32, 35, 237, 370.2

[56] References Cited

U.S. PATENT DOCUMENTS

| | | | |
|---|---|---|---|
| 2,320,852 | 6/1943 | DeFalco | 160/84.1 |
| 2,874,611 | 2/1959 | Luboshez | 160/84.1 X |
| 2,874,612 | 2/1959 | Luboshez | 160/84.1 X |
| 3,443,860 | 5/1969 | Luboshez | 160/84.1 X |
| 3,946,788 | 3/1976 | van Muyen | 160/84.1 |
| 4,019,554 | 4/1977 | Rasmussen | 160/84.1 |
| 4,422,492 | 12/1983 | Bledsoe | 160/84.1 |
| 4,544,011 | 10/1985 | Sawamura | 160/84.1 |
| 4,625,786 | 12/1986 | Carter et al. | 160/84.1 |
| 4,679,610 | 7/1987 | Spraggins | 160/84.1 X |
| 4,865,106 | 9/1989 | Wichelman | 160/84.1 |
| 4,974,656 | 12/1990 | Judkins | 160/84.1 |

Primary Examiner—David M. Purol

[57] ABSTRACT

A pleated shade for aircraft windows has metallic thermal expansion control strips respectively secured to all of either the inside or outside faces of the pleats to prevent wrinkling of the pleat material due to prolonged exposure to sunlight.

3 Claims, 4 Drawing Sheets

SUN RESISTANT, FOLDABLE WINDOW SHADE

BACKGROUND OF THE INVENTION

1. Field of the Invention

This invention relates to a foldable shade or blind for use in covering windows of vehicles, and particularly aircraft windows, to prevent penetration of sunlight through the window and to resist the deleterious effects of such sunlight upon the foldable shade.

2. Summary of the Prior Art

Many vehicles, such as aircraft and mobile homes, have windows that are exposed for many hours to direct sunlight. Ordinary shades applied to such windows may cut off the sunlight but, in a short time, the shades assume a wrinkled and faded appearance, which adversely effects the external appearance of the entire vehicle. This is particularly true of aircraft wherein a large number of windows, each having its respective shade, define a substantial portion of the exterior of the aircraft.

A common form of sunshade employed in aircraft utilizes a sheet of woven plastic or textile materials which is horizontally reversely folded to define a plurality of interconnected pleats. The pleats can be compressed into a small space above the window with the faces of adjacent pleats in abutment. To cover all or part of the window, the lower portion of the pleated sheet is pulled downwardly, thus angularly separating the pleats to cover all or part of the window.

While these pleated sheets perform the function of preventing undesired sunlight entering the cabin of the aircraft, the heat generated in each shade by sunlight incident thereon is sufficient to effect a substantial expansion of the textile material. Textile materials do not, however, consistently thermally expand or contract. Thus, as shown in FIG. 1 of the drawings, prior art shades repeatedly exposed to sunlight rapidly assume a wrinkled configuration due to the fact that the textile material expands, but does not consistently contract to its original dimensions when removed from the sunlight.

There is, therefore, a distinct need for a shade for vehicle windows that can be exposed for many hours to direct sunlight without undergoing any permanent change in configuration of the shade.

SUMMARY OF THE INVENTION

A pleated shade for a vehicle window, such as an aircraft, embodying this invention utilizes a sheet of woven fabric material, such as polyester which is readily formed into pleats by horizontally reversely folding the material. One problem encountered in fabricating such pleated sun screens is that each vehicle requires a different height of shade in its fully extended position. The pleated textile material is normally purchased in that form from textile manufacturers. In accordance with this invention, the effective height of the shade may be readily selected by sewing the outermost folds of the pleated shade together by stitching located adjacent and parallel to the outer fold. In fact, the spacing of such stitching relative to the outermost fold normally determines the maximum height of the shade when fully extended.

To prevent the undesired wrinkling of the shade material when it is exposed to many hours of sunshine, this invention contemplates adhesively securing a thin metallic flat strip or band to substantially all areas of one face of each pleat, preferably the outer face. One edge of the flat strip will lie adjacent to the aforementioned stitches while the other end will lie adjacent to the inner fold of the pleated material. Such flat strip preferably comprises stainless steel aluminum, aluminum alloys or other metal having similar thermal expansion and contraction properties. The important requisite is that the band be consistently thermally expandable and contractible. Thus, when the shade incorporating the metallic bands is heated by incident sunlight, the metallic bands will expand and will subject the adhesively secured fabric to an equal expansion. More importantly, however, when the sunlight is removed and the shade is subjected to much colder temperatures, as when an aircraft is in flight, the metallic strips will contract to their original dimensions and carry with them to the contracted position, the fabric of the pleats. Thus, wrinkling of the pleats is minimized, if not entirely eliminated.

In order to provide an eye attractive external appearance, the pleated shade embodying this invention preferably has all of its external surfaces covered with a light reflecting film. Such film may be a metalized polyester or other suitable plastic, or aluminum foil. The purpose of the film is to provide a light reflecting surface of uniform appearance. The film may be applied adhesively or by sewing.

Another problem solved by the present invention is the incorporation of means for equalizing the vertical separation of the various pleats in the closed position of the shade. It is well known, as stated in U.S. Pat. No. 4,544,011, to SAWAMURA, that the weight of a pleated shade in its partially or fully closed position, will cause the upper pleats to be separated to a greater extent than the lower pleats, thus producing an unsightly appearance. This uneven expansion of the pleats is eliminated in accordance with this invention with the application to both lateral edges of the pleated shade of a narrow width pleated band, the pleats of which are substantially smaller than the pleats of the sun shade or screen. Thus, all pleats of the primary sun shade are limited in their expansion by the maximum permissible expansion of the pleated strips applied to the lateral edges of the primary sun shade or screen.

Further objects and advantages of the invention will be readily apparent to those skilled in the art from the following detailed description, taken in conjunction with the annexed sheets of drawings, on which is shown a preferred embodiment of the invention.

DESCRIPTION OF PREFERRED EMBODIMENTS

Figure 1:
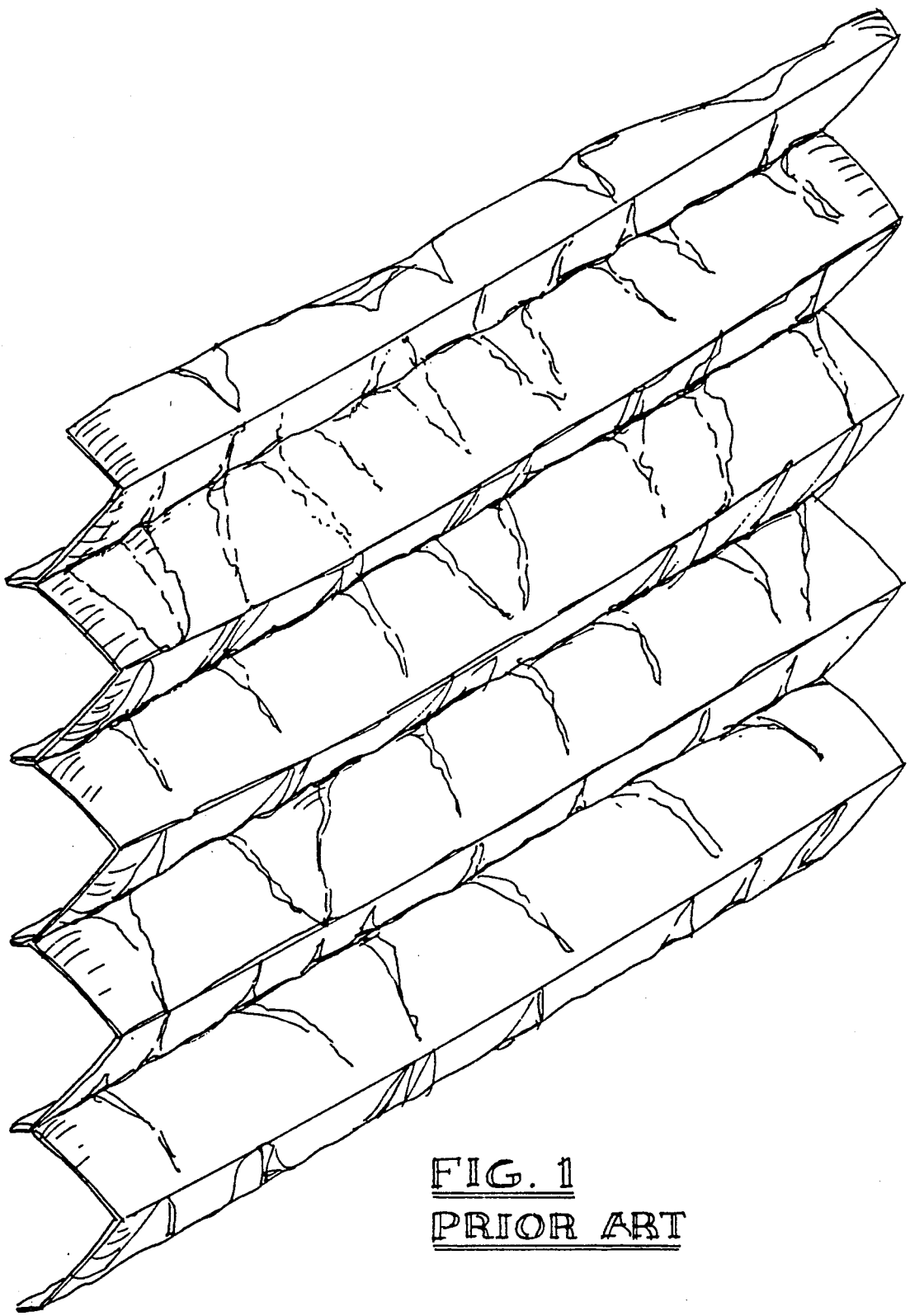
FIG. 1 is a perspective view of a prior art shade showing the wrinkling produced in such shade through repeated exposures to sunlight.

Since the mounting of pleated shades for aircraft windows is well known, details of such mounting have not been shown in the drawings. By way of illustration only, one conventional mounting is shown in U.S. Pat. No. 4,679,610 to Spraggins. As will be apparent from the disclosure of that patent, the shade is formed from a pleated sheet material, which, prior to the pleating has a height substantially greater than that of the window area to be covered, and a width positioning both sides into a suitable recess in the window frame. When the shade is in its folded, closed position, it assumes a compact configuration and is normally located in a recess in a window frame above the top of the window. Since the shade mounting elements form no part of this invention, they have not been shown in the drawings and will not be further described.

Referring to FIG. 1, there is shown a portion of a prior art pleated window shade S having pleats P which has been repeatedly exposed to sunlight for a substantial number of hours. It will be noted that the shade material, which is normally formed from a plastic textile, such as a polyester, has assumed a wrinkled appearance on the outside, thus providing an unsightly appearance to the entire side of the aircraft in which the window shades are mounted.

Figure 2:
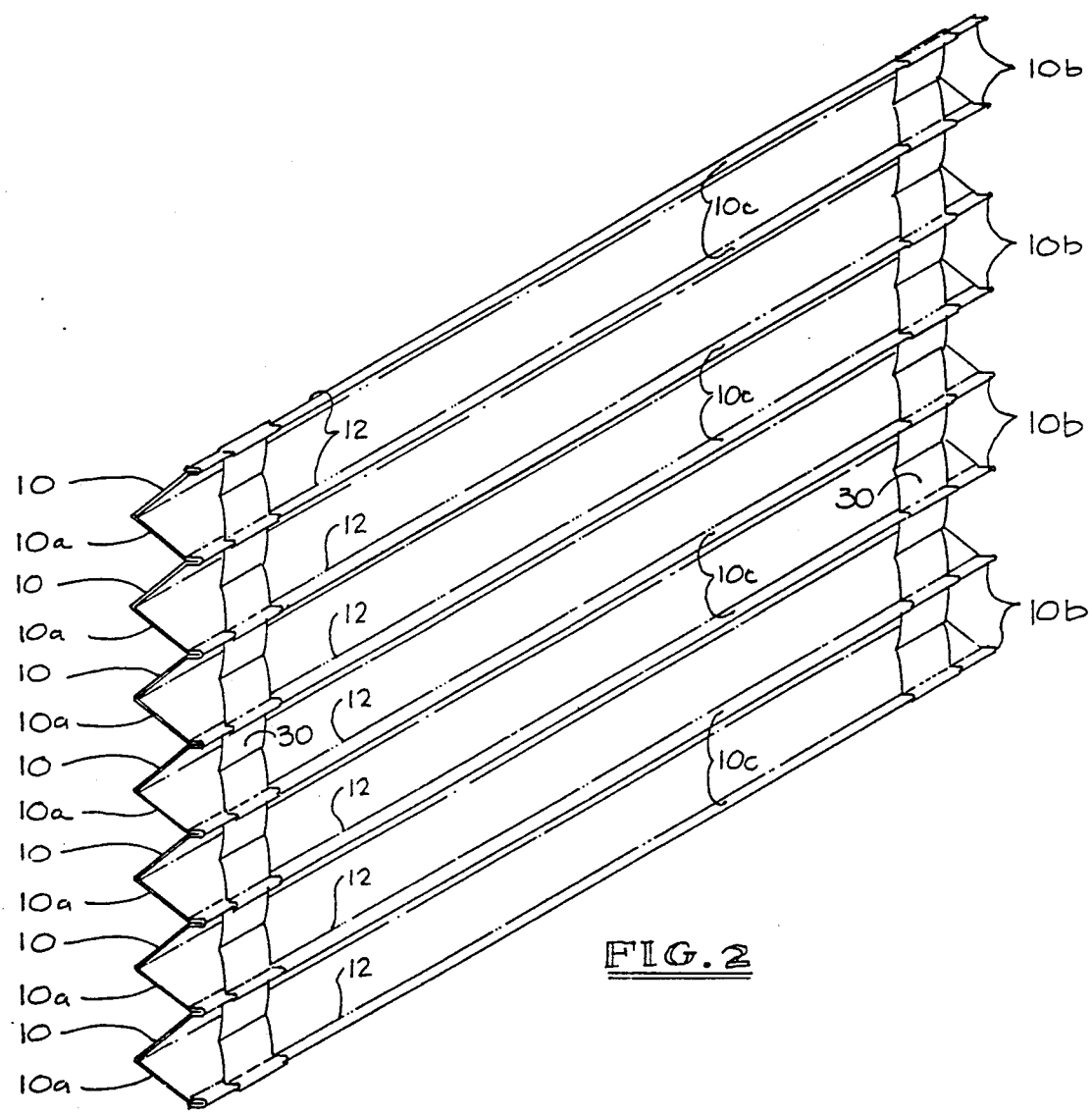
FIG. 2 is a perspective view of a portion of a vehicle window sun shade embodying this invention.

Referring now to FIG. 2, a window shade 1 embodying this invention comprises a base sheet 10 of plastic textile material, such as a polyester, which has been horizontally folded or creased to form a plurality of vertically adjacent pleats 10a. The pleats may be folded upwardly into abutting relationship to assume a very compact configuration wherein it is entirely concealed within a recess conventionally provided in the window frame. Prior to and after folding into pleats, the base sheet is of rectangular configuration, with a height and width exceeding the height and width of the window frame opening, as is conventional.

Figure 3:
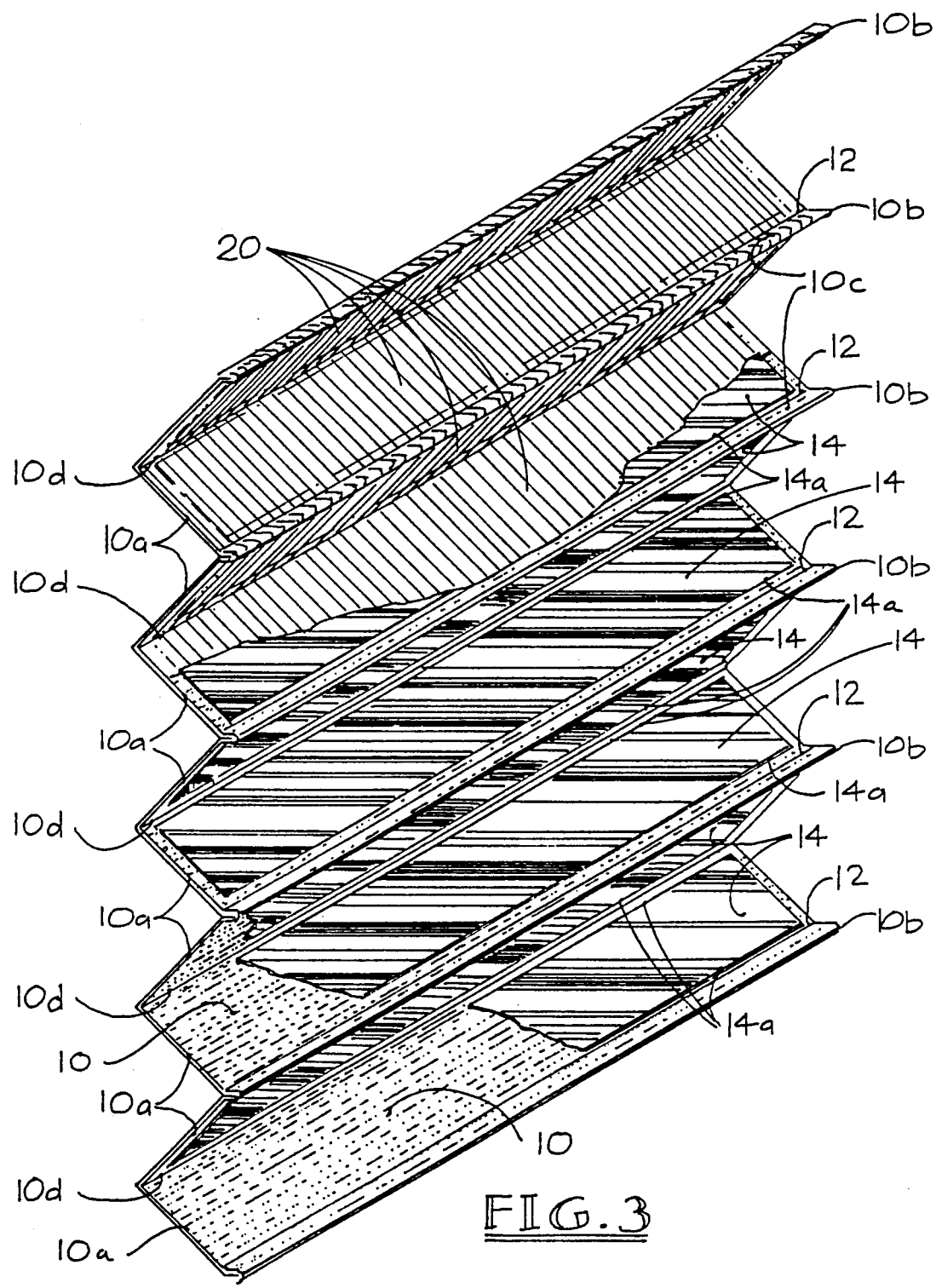
FIG. 3 is a view similar to FIG. 2 but having portions of the materials forming the sun shade broken away to show materials incorporated in the sun shade which are normally not visible.
Figure 4:
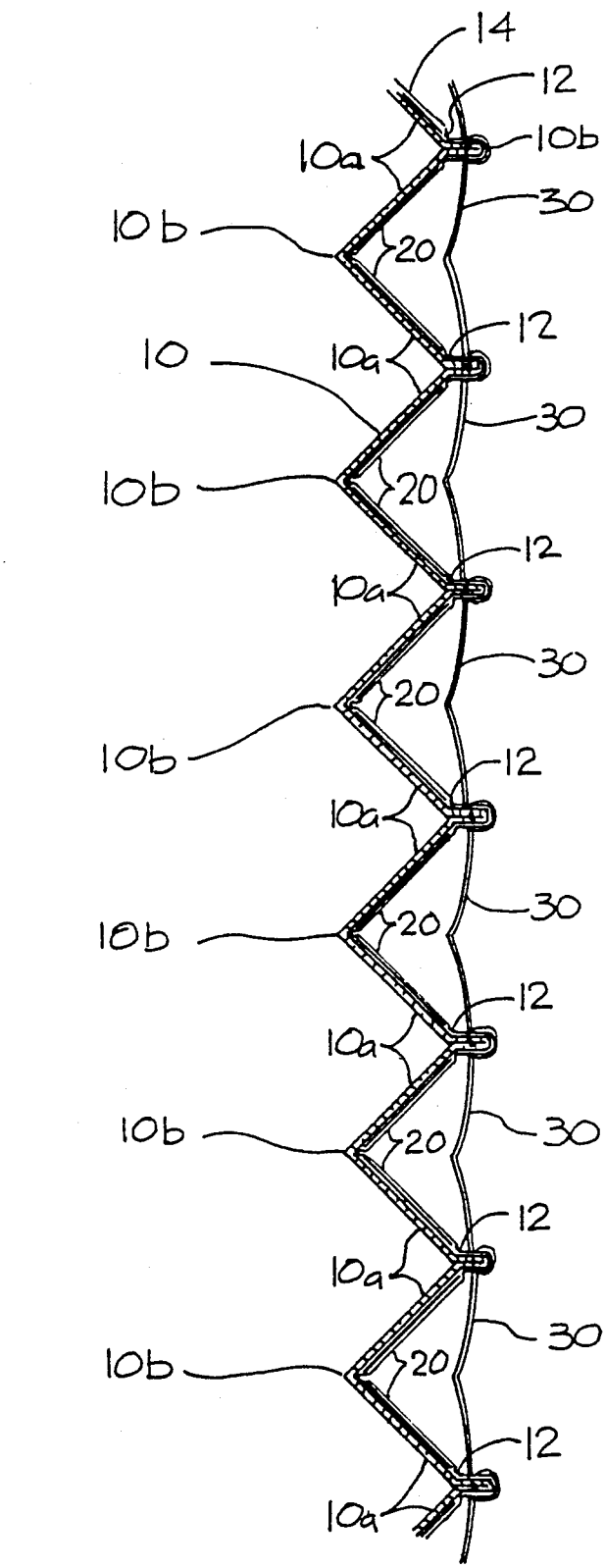
FIG. 4 is a sectional view taken on a vertical plane traversing the sun shade of FIG. 2.
Figure 5:
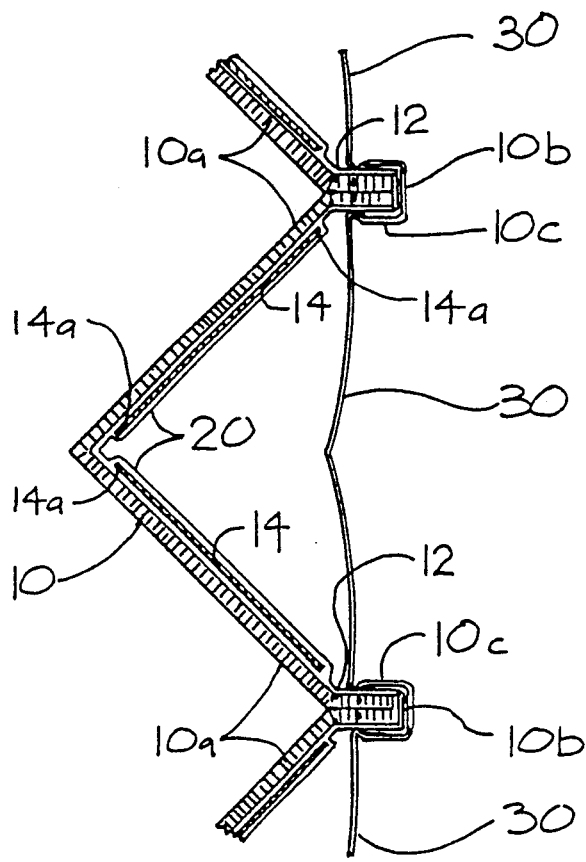
FIG. 5 is an enlarged scale view of a portion of FIG. 4.

As best shown in FIG. 3, an aircraft window shade 1 embodying this invention comprises a lamination of three materials. The base material 10 normally forming the inner face of the shade 1 comprises the aforementioned plastic textile material which has suitably decorated or embossed to provide a pleasant appearance to the occupants of the aircraft. Such materials are normally purchased in pleated form from manufactures of the fibrous plastic sheet material. Thus, the height of the individual pleats is only available in a limited number of discrete sizes. Such sizes may not conform to the desired height dimension of shades for a particular aircraft.

To overcome this problem, the plastic textile material 10 has a line of stitching or adhesive 12 applied adjacent, but spaced from the outer fold 10b which secures the extreme ends of the outer folds of the shade in abutment, forming ribs 10c. The spacing of the stitching 12 relative to the outer fold 10b effectively determines the height of the pleats and thus determines the total effective height of the shade 1.

Referring again to FIG. 3, one of the faces, preferably the outer face of each of the pleats 10a has a flat strip of metallic material 14 adhesively secured across substantially its entire area. Preferably, the edge 14a of each strip is adjacent but spaced from the threads 12 while the inner edge of each strip lies adjacent, but closely spaced from the inner fold 10d. The preferred materials for the flat strip 14 are aluminum or stainless steel having a thickness in the range of 0.002 inches to 0.005 inches. A flat strip having this thickness has sufficient strength to accomplish the control of the thermal expansion of the fibrous plastic base sheet element of each pleat 10a, and yet does not add a significant amount of weight to the aircraft shade which, of course, is an important factor. Aluminum alloys or stainless steel are preferred materials but any metallic material having a substantial and consistent co-efficient of thermal expansion and contraction may be employed.

When the flat strips 14 are applied to the outer faces of the pleats 10a, they are preferably completely covered by a thin film of light reflecting material 20, such as aluminum foil or a film of metalized polyester or other plastic. Such film improves the appearance of the shade and reflects the incident sunlight to reduce the amount of heat transmitted to the flat metallic strips 14 and the textile base material forming the pleats 10a.

If the flat strips 14 are applied to the inner faces of the pleats 10, then a decorative film or sheet, such as embossed silk, would be applied over all exposed areas of the inner faces of the pleats 10 to satisfy the internal appearance requirements of the aircraft.

A shade 1 embodying this inventions substantially prevents distortion of the textile material forming the base lamination of the shade due to control of the thermal expansion and contraction of such material by the adhesively secured metallic strips 14. Such strips do expand when impacted by incident sunlight, but carry the textile material with them. Similarly, when the sunlight is reduced or withdrawn, the flat strips 14 contract and carry the textile material back to its original position, thus eliminating the unsightly wrinkled appearance normally encountered by prior art constructions of aircraft window shades, as illustrated in FIG. 1.

Another feature of this invention is illustrated in FIG. 2 whereby the separation of the pleats 10a in their closed or angularly expanded positions is controlled. Such control is effected by a pair of narrow width pleated strips 30 of a textile material. These strips are sewed, stapled or adhesively secured to the ribs 10b formed by the stitching 12 and are located closely adjacent to the lateral edges of the shade 1 so as to be concealed by the window frame from observation. The vertical height of each of the pleats of the strips 30 is significantly less than the possible vertical heights of the pleats 10a, thus limiting the angular separation of the pleats 10a as the shade 1 is expanded downwardly to its closed position. Thus, the pleated strips 30 eliminate any greater separation of the upper pleats 10a than the lower pleats 10a due to the weight of the shade which is supported by such upper pleats as the shade approaches its closed position.

From the foregoing description, it will be readily apparent to those skilled in the art that a vehicle window shade embodying this invention provides a significant reduction in the tendency of prior art shades to wrinkle or otherwise assume an unsightly appearance due to the heating effects of incident sunlight. Moreover, the exterior faces of the pleats will always be equally spaced due to the action of the restraining strips 30 regardless of whether the shade is half closed or fully closed.

Obviously, a shade embodying this invention is applicable to house or building windows. While described as being closed by a downward movement, this is merely a relative term, since the shade may be closed by a downward movement, or, if desired the shade can be rotated in the frame by 90° and opened or closed by horizontal movement.

What is claimed and desired to be secured by Letters Patent is:

1. A sun shade for a generally rectangular aircraft window having a width and height dimension, comprising, in combination:

a generally rectangular sheet of woven plastic material having a width slightly greater than the width of the aircraft window, and a height exceeding the height of the aircraft window;

said sheet being horizontally reversely folded to form a plurality of integrally connected pleats disposable in abutting relation above the aircraft window in the inoperative position of the shade, and being vertically expandable by downward movement of the pleats to form an angular relationship between adjacent pleats to cover all or a selected portion of the aircraft window;

each pleat having two outer faces disposed in juxtaposition to the aircraft window and two inner faces facing away from the aircraft window; and a metallic expansion control strip having a thickness of at least 0.002 inches adhesively secured to substantially all portions of one of a group comprising all outer faces and all inner faces, whereby thermal expansion and contraction of each said pleat is determined by the respective metallic control strip.

2. The apparatus of claim 1 wherein said metallic expansion control strips are respectively secured to said outer faces of said pleats, and further comprising a light reflecting film secured in overlying relation to all said metallic strips.

3. The apparatus of claim 1 wherein said metallic expansion control strips comprise stainless steel.

* * * * *